US010581932B2

(12) United States Patent
Addepalli et al.

(10) Patent No.: US 10,581,932 B2
(45) Date of Patent: Mar. 3, 2020

(54) NETWORK-BASED DYNAMIC DATA MANAGEMENT

(71) Applicant: Cisco Technology, Inc., San Jose, CA (US)

(72) Inventors: Sateesh K. Addepalli, San Jose, CA (US); Raghuram S. Sudhaakar, Fremont, CA (US); Jean-Philippe Vasseur, Saint Martin D'uriage (FR); Flavio Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 729 days.

(21) Appl. No.: 15/264,039

(22) Filed: Sep. 13, 2016

(65) Prior Publication Data
US 2016/0381087 A1 Dec. 29, 2016

Related U.S. Application Data

(62) Division of application No. 13/313,817, filed on Dec. 7, 2011, now Pat. No. 9,462,040.

(51) Int. Cl.
G06F 16/00 (2019.01)
H04L 29/06 (2006.01)
G06F 16/2458 (2019.01)
G06F 16/787 (2019.01)
H04L 29/08 (2006.01)

(52) U.S. Cl.
CPC ...... H04L 65/1073 (2013.01); G06F 16/2477 (2019.01); G06F 16/787 (2019.01); H04L 67/10 (2013.01); H04L 67/18 (2013.01)

(58) Field of Classification Search
CPC ... G06F 16/285; G06F 16/787; G06F 16/9024
See application file for complete search history.

(56) References Cited

U.S. PATENT DOCUMENTS 7,606,895 B1 10/2009 Dini et al.
8,255,971 B1 8/2012 Webb et al.
2005/0273686 A1 12/2005 Turner et al.
2006/0143439 A1 6/2006 Arumugam et al.
2007/0208711 A1 9/2007 Rhoads et al.
(Continued)

OTHER PUBLICATIONS

Willett, Rebecca, Aline Martin, and Robert Nowak. "Backcasting: adaptive sampling for sensor networks." Proceedings of the 3rd international symposium on Information processing in sensor networks. Acm, 2004.*
(Continued)

Primary Examiner — Nan Hutton
(74) Attorney, Agent, or Firm — Behmke Innovation Group LLC; James Behmke; Stephen D. LeBarron

(57) ABSTRACT

In one embodiment, a router operating in a hierarchically routed computer network may receive collected data from one or more hierarchically lower devices in the network (e.g., hierarchically lower sensors or routers). The collected data may then be converted to aggregated metadata according to a dynamic schema, and the aggregated metadata is stored at the router. The aggregated metadata may also be transmitted to one or more hierarchically higher routers in the network. Queries may then be served by the router based on the aggregated metadata, accordingly.

15 Claims, 15 Drawing Sheets

(56) References Cited

U.S. PATENT DOCUMENTS

| | | |
|---|---|---|
| 2009/0085769 A1 | 4/2009 | Thubert et al. |
| 2009/0122797 A1 | 5/2009 | Thubert et al. |
| 2009/0198790 A1 | 8/2009 | Grevers, Jr. |
| 2009/0210075 A1* | 8/2009 | Moriwaki ............ H04L 41/0654 700/28 |
| 2010/0058469 A1 | 3/2010 | Yen et al. |
| 2011/0016351 A1 | 1/2011 | Turner et al. |
| 2011/0085461 A1 | 4/2011 | Liu et al. |
| 2011/0119212 A1 | 5/2011 | De Bruin et al. |
| 2011/0185021 A1* | 7/2011 | Han ................... H04L 65/1016 709/204 |

OTHER PUBLICATIONS

Tubaishat, Malik, et al. "A secure hierarchical model for sensor network." Acm Sigmod Record 33.1 (2004): 7-13.*
Rajagopalan et al., Data aggregation techniques in sensor networks: A survey; Department of Electical Engineering & Computer Science, Syracuse Univerysity, 2006.
Ozdemir et al., "Secure data aggregation in wireless sensor networks: A comprehensive overview", Computer Networks 53.12 (2009); pp. 2022-2037.
Honeywell Building Solutions, "Delivering Measurable RO: The Value of Integration", Document No. SL-53-2079, Honeywell International Inc., Aug. 2007, 9 pages.

* cited by examiner

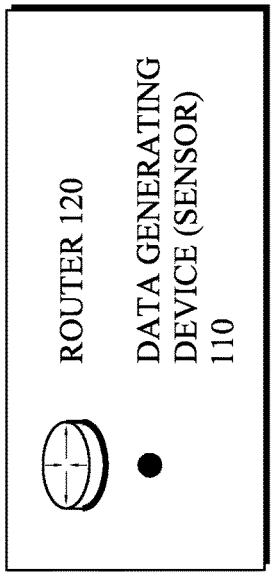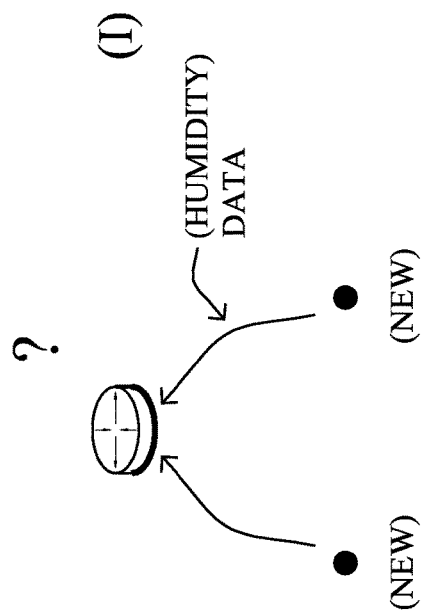
FIG. 5A

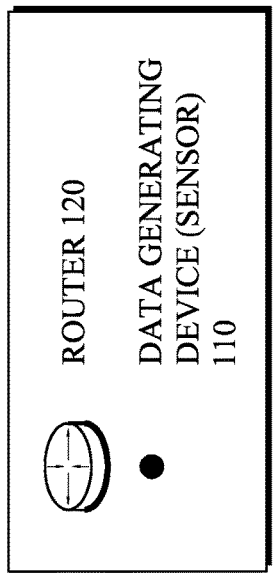
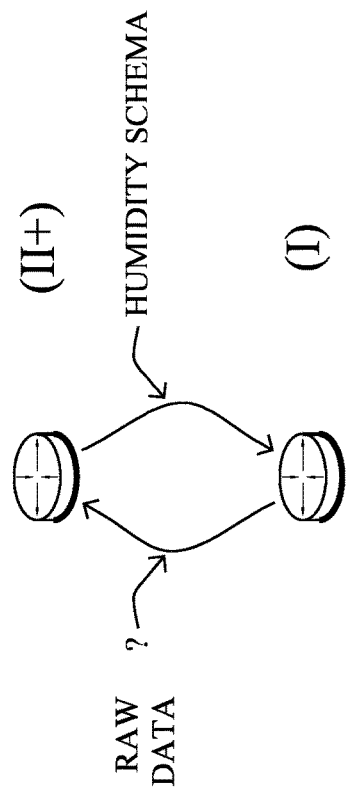
FIG. 5B

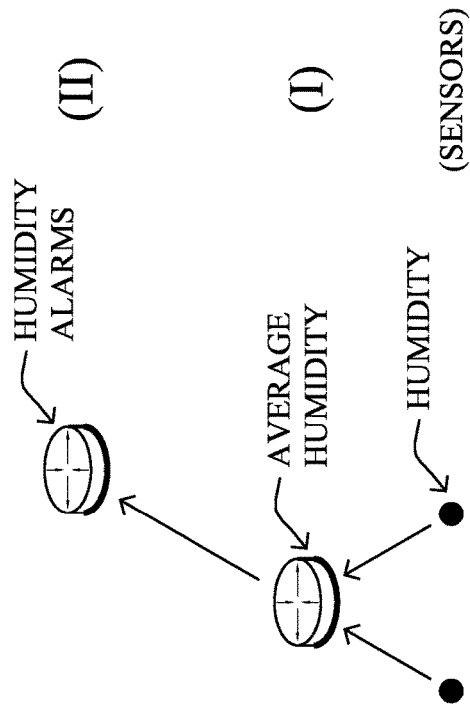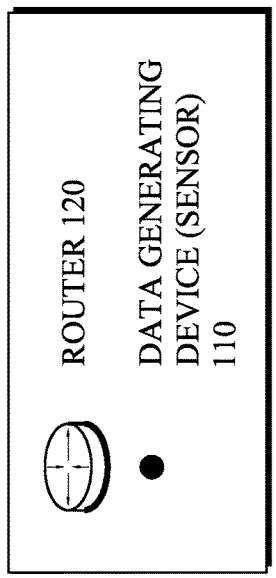
FIG. 5C

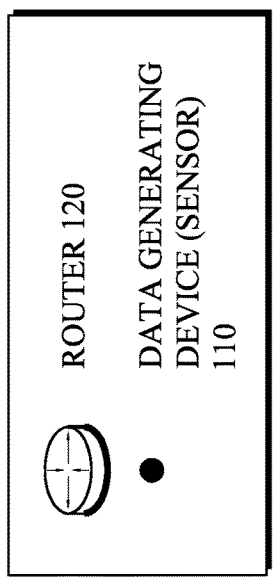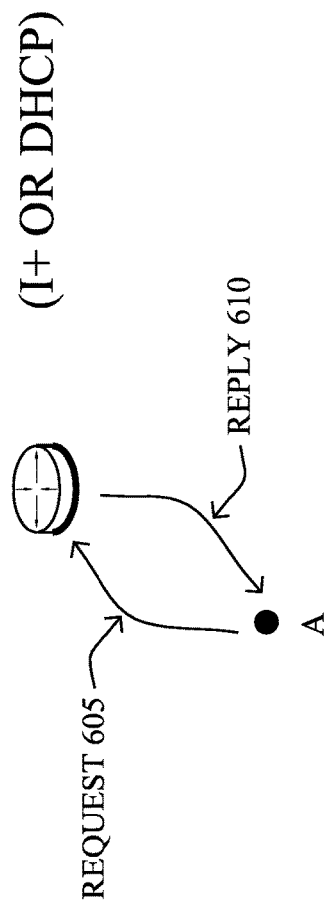
FIG. 6A

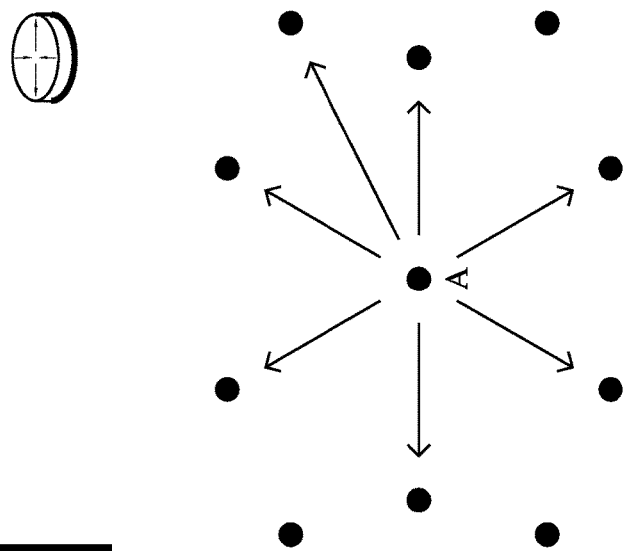
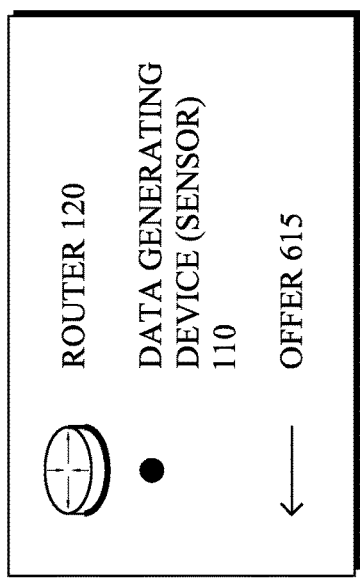
FIG. 6B

NETWORK-BASED DYNAMIC DATA MANAGEMENT

RELATED APPLICATION

This application is a Divisional Application of U.S. patent application Ser. No. 13/313,817, filed Dec. 7, 2011, entitled NETWORK-BASED DYNAMIC DATA MANAGEMENT, by Addepalli, et al., the contents of which is incorporated herein by reference.

TECHNICAL FIELD

The present disclosure relates generally to computer networks, and, more particularly, to data collection (e.g., "big data" or "large data," etc.) in computer networks.

BACKGROUND

Current cloud computing models for real-time action and close control loops on data requires hauling all of the data generated, typically at the edge of the network, to cloud/data centers at the core of the network. In the future, networks will include a large number of data generating elements that will produce high volumes of data from sources such as sensors. For example, in many of these networks, smart objects such as sensors will be present in the order of millions if not more. As such, the quantity of data generated by the large number of sensors will be so large that it will end up choking the access network very easily, that is, the rate of data that will be generated by the sensors will be much greater than the physical transfer rates that the access routers will be capable of. In addition, current cloud-based schema and queries are fairly static in nature, and the ever-changing nature of sensors and their data types at the edge, as well as close control loop-based action, thus create difficult schema modification and re-indexing.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5C illustrate another example of dynamic hierarchical data collection for updating a dynamic schema;
FIGS. 6A-6C illustrate an example of dynamic data collection for activating data generating devices.

DESCRIPTION OF EXAMPLE EMBODIMENTS

Overview

Figure 1:
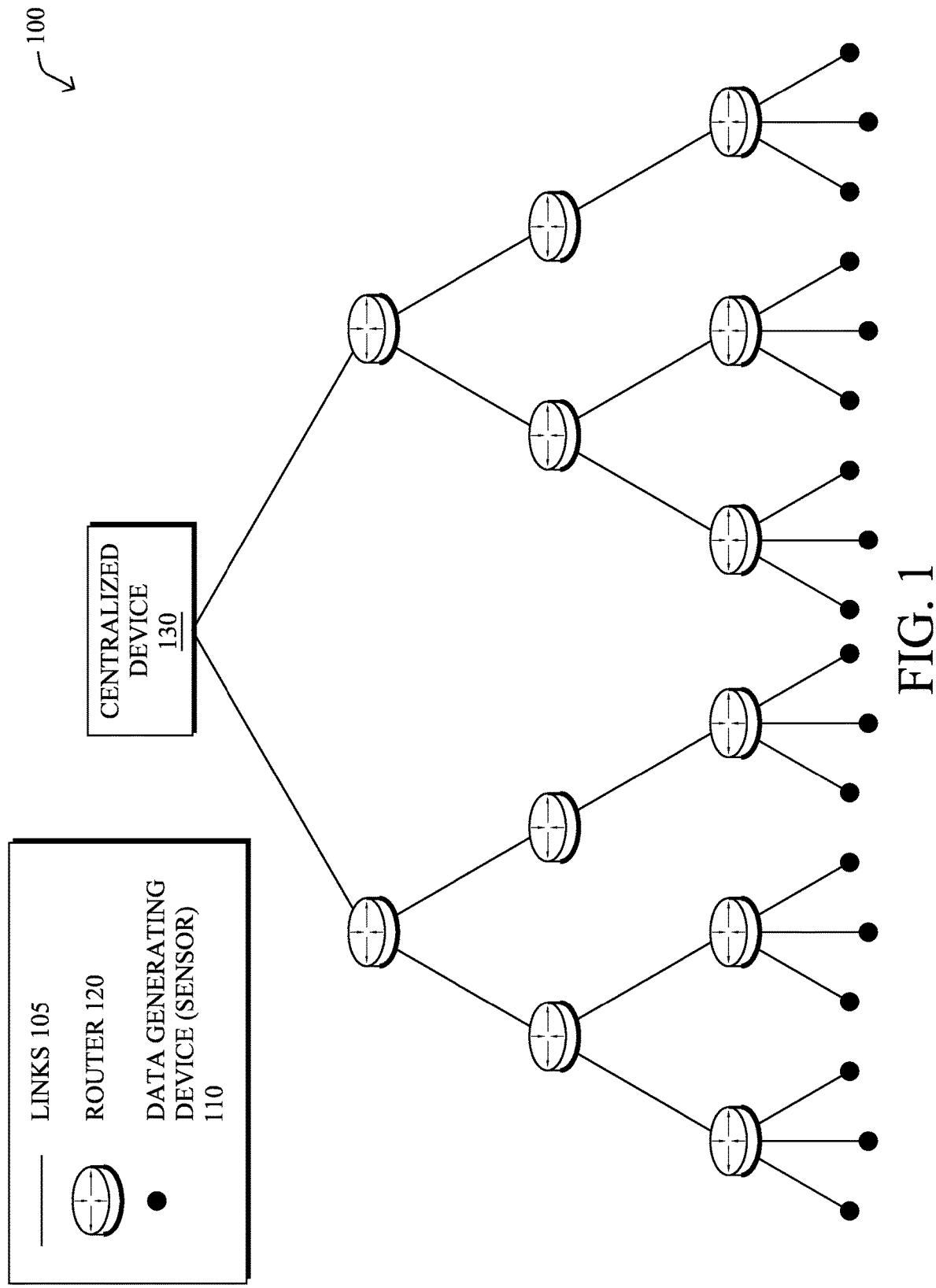
FIG. 1 illustrates an example computer network.

According to one or more embodiments of the disclosure, a router operating in a hierarchically routed computer network may receive collected data from one or more hierarchically lower devices in the network (e.g., hierarchically lower sensors or routers). The collected data may then be converted to aggregated metadata according to a dynamic schema, and the aggregated metadata is stored at the router. The aggregated metadata may also be transmitted to one or more hierarchically higher routers in the network. Queries may then be served by the router based on the aggregated metadata, accordingly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

FIG. 1 is a schematic block diagram of an example computer network 100 illustratively comprising nodes/devices such as a plurality of data generating devices (e.g., sensors) 110 and a plurality of hierarchically communicating routers 120, all interconnected by various methods of communication. For instance, the links 105 may be wired links or shared media (e.g., wireless links, PLC links, etc.) where certain nodes may be in communication with other nodes, e.g., based on distance, signal strength, current operational status, location, etc. Those skilled in the art will understand that any number of nodes, devices, links, etc. may be used in the computer network, and that the view shown herein is for simplicity. Also, a centralized device 130 (e.g., network management server or "NMS," a data center, an interactive content server, etc.) may also be present within the network 100, for example, as shown, at the logical "top" of the hierarchical architecture as shown.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
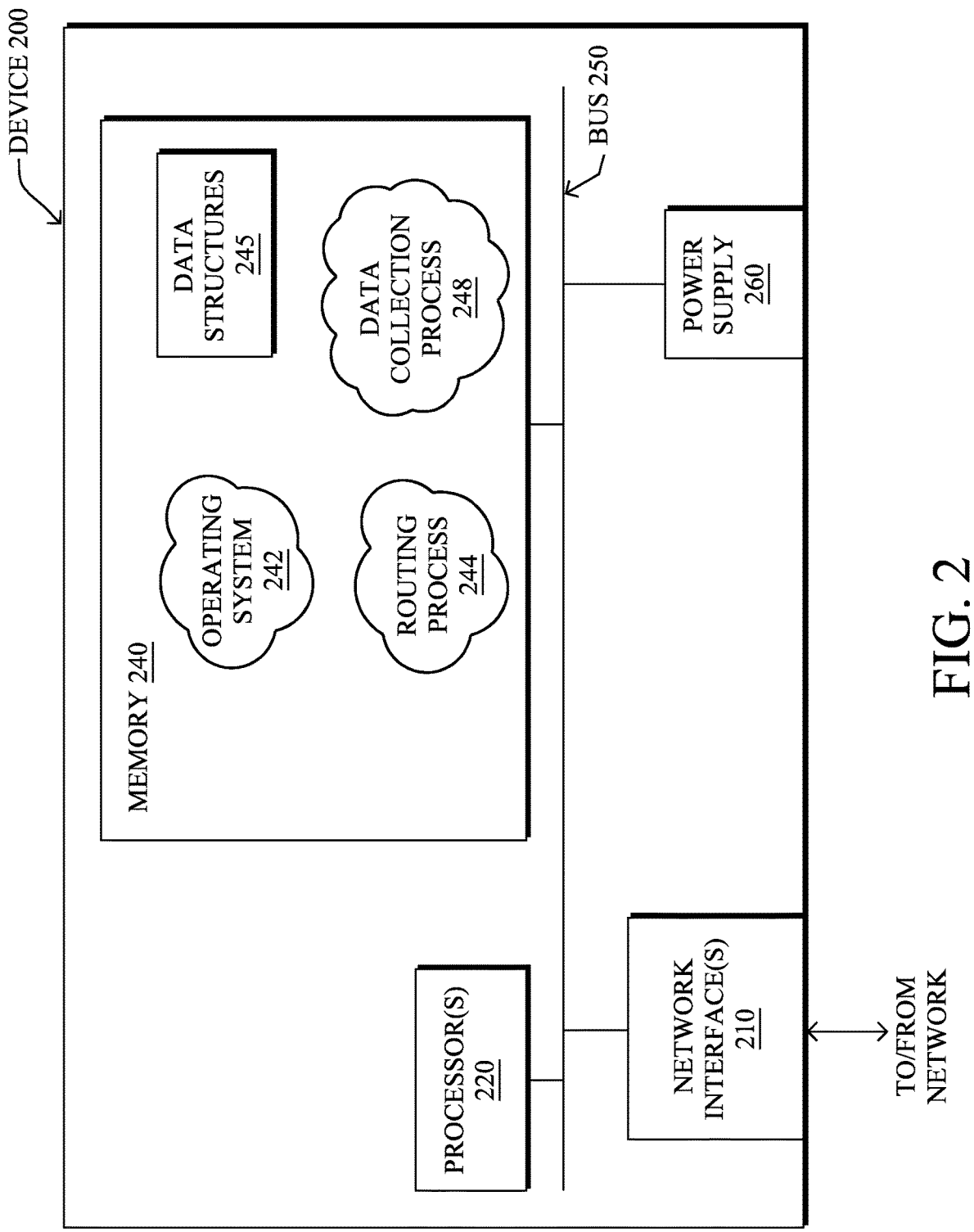
FIG. 2 illustrates an example network device/node.

FIG. 2 is a schematic block diagram of an example node/device 200 that may be used with one or more embodiments described herein, e.g., as a router 120, or in certain embodiments, as a data generator (e.g., sensor) 110. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "data collection" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

As noted above, current cloud computing models for real-time action and close control loops on data requires hauling all of the data generated, typically at the edge of the network, to cloud/data centers at the core of the network. In the future, networks will include a large number of data generating elements that will produce high volumes of data from sources such as sensors. For example, in many of these networks, smart objects such as sensors will be present in the order of millions if not more. Example sources of data include, but are not limited to, any smart objects such as sensors, points-of-sale, mobile devices, smart devices, localized warehouses, video sensors, audio sensors, etc. As such, the quantity of data generated by the large number of sensors will be so large that it will end up choking the access network very easily, that is, the rate of data that will be generated by the sensors will be much greater than the physical transfer rates that the access routers will be capable of.

Actionable knowledge inferred from such data, in most cases, will be applicable to only a relatively small geographical region around which the data was produced. As a result the current model of hauling the data to the cloud and processing it to infer actionable knowledge causes an increase in traffic, latency and cost. In addition, although many routers today generally include storage and processing capabilities, they do not have a standard operating platform/framework on which such services can be provided. As a result such edge compute services are not available today.

Moreover, current cloud-based schema and queries are fairly static in nature and do not serve the changing nature of the sensors and their data types at the edge and corresponding dynamic close control loop based action needed to manage or prevent a situation. That is, typically, databases are used for storing data that will be used to serve future queries related to the data. However, the type, amount, and quality of data that will be received by each access router may be continuously changing as sensors are added, removed, and upgraded in the sensor network. As a result, standard databases, which are static with regard to their schema, will not serve the purpose due to the large overhead of schema modification and re-indexing.

As described herein, the processing and storage of the data at the edge of the network in a distributed fashion offers many advantages over the traditional model where sensed data is accumulated from a central location where it is processed (furthermore, it is obvious that such a model will not scale). The techniques herein can also serve the queries that relate to that data much faster than if the data were stored/queries served by the cloud. Note that this is a must-have in a number of scenarios where sensed data may require the trigger of an immediate action. Since sensor networks are usually highly constrained in terms of bandwidth and network capacity, processing the data in the cloud or in a central location is not viable considering the delay constraints.

By contrast, with a distributed approach as described herein, each device can store a part of the data that is most relevant to its surrounding. Thus the system will be capable of providing high granularity location-aware services. Note also that in certain environments, the reaction time is so constrained that there is no other choice than to perform local processing.

According to the present disclosure, therefore, a system is specified for providing such edge devices with services that can improve the quality and speed of actionable knowledge inference and also for managing these data services remotely.

In particular, the techniques herein are directed toward the dynamic management of potentially high-volume sensor data at the edge of a network using hierarchical gateways/routers equipped with processing and storage. For example, several aspects of the embodiments herein are described in detail below, such as: 1. A new sensor data and format discovery, e.g., using a modified dynamic host control protocol (DHCP) scheme with multicast; 2. A mapping technique for reducing sensor data using hierarchical routing, with lower order access routers connected to sensor clusters running streaming queries; and 3. Having higher order routers process higher order queries by splitting query operations to lower order access routers in a local-aware fashion, down to the routers actually connected to sensor clusters, which in turn operate on streaming sensor data and returns results. In addition, in order to achieve dynamic close control loop based action needed to manage or prevent a situation, described herein is a technique in which the schema is continuously changing based on the new data types being discovered (e.g., new sensors and their data formats) and queries that are being received.

Specifically, according to one or more embodiments of the disclosure as described in detail below, a router operating in a hierarchically routed computer network may receive collected data from one or more hierarchically lower devices in the network (e.g., hierarchically lower sensors or routers). The collected data may then be converted to aggregated metadata according to a dynamic schema, and the aggregated metadata is stored at the router. The aggregated metadata may also be transmitted to one or more hierarchically higher routers in the network. Queries may then be served by the router based on the aggregated metadata, accordingly.

Illustratively, the techniques described herein may be performed by hardware, software, and/or firmware, such as in accordance with the "data collection" process 248, which may contain computer executable instructions executed by the processor 220 to perform functions relating to the novel techniques described herein.

Operationally, according to the techniques herein, computation and storage resources on hierarchical devices of the network 100, particular at the "edge" (hierarchically lower devices) closest to the data generators 110, is now possible since such devices are becoming more powerful. For example, it is common for current inexpensive micro-controllers to be equipped with 32-bit processors, several dozens of KBytes of RAM and several hundreds of KBytes of Flash. By using them effectively, the techniques herein can provide services that operate/rely on data that has a geographical context. For example fine-grained temperature information of a particular area can be stored at routers that provides the last mile service to that area. In many cases there may be multiple routers that provide this last mile service and they can cooperate to provide services. This allows for improved efficiency of the service in terms of latency, availability, etc.

Since it is poorly scalable (and nearly infeasible) to just store the raw data collected from all of the data generation device 110, the techniques herein convert the raw data to metadata using "schemas" that are illustratively derived from past user queries, or else from previous configuration. (Schema as described herein may be created according to a traditional static/streaming database or using an XML-based (extensible markup language) row-column semantic mapping technique.) In particular, routers (e.g., edge devices) may be connected in a hierarchical manner so that the devices higher up the hierarchy (closer to the centralized device 130) will process the data differently, and store more generic metadata than the lower layer devices. Note that as used herein, "collected data" may refer to hierarchically lower raw data (e.g., sensor data) from one or more hierarchically lower data generators (e.g., sensors) 110 in the network, or else may refer to hierarchically lower aggregated metadata from one or more hierarchically lower routers 120 in the network. Generally, the metadata between different hierarchically adjacent layers does not overlap, thus minimizing the redundancy in the stored data. Illustratively, the access/aggregation (A/Ag) routers may run streaming databases to convert the raw data into schema-based metadata representation.

Figure 3:
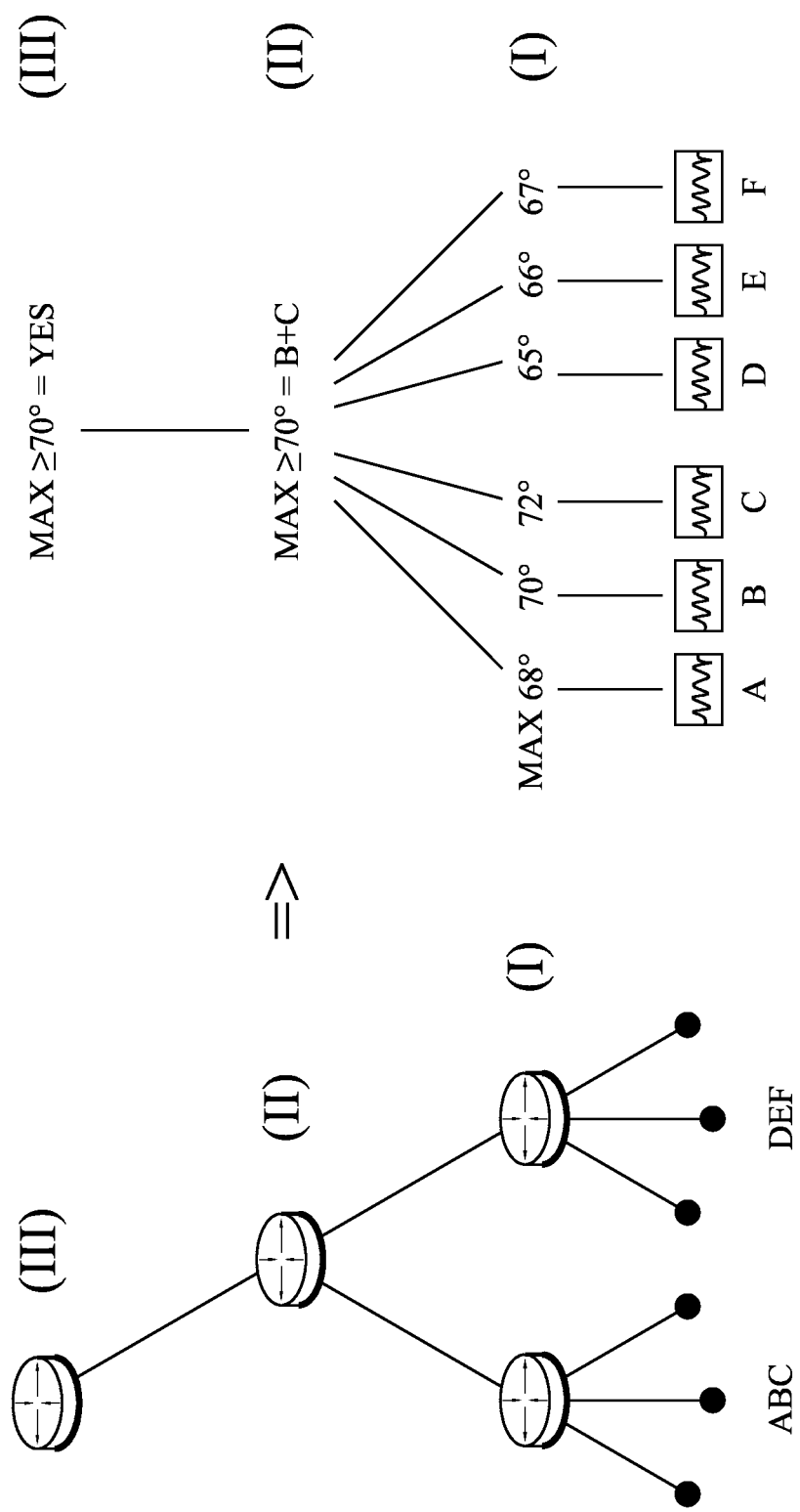
FIG. 3 illustrates an example of hierarchical data collection.

As an example, FIG. 3 illustrates an instance where the network is configured to monitor temperature of a location.

Assume, for example, that the sensors 110 are configured to generate data corresponding to a current temperature at a given moment throughout the day, and transmits this data to the first layer (I) of routers 120. Based on hierarchal schema, these routers may store an average temperature, a maximum temperature, etc. The next higher level of routers (II) may only need to store which temperatures have breached a particular temperature, while even higher routers (III) (hierarchically) may store even less metadata about these particular events, such as whether any sensor has ever broken a particular temperature. When applied in a hierarchical manner in this way, e.g., within in Smart connected communities, this technique can be used to provide high granularity location specific service to a room/unit, floor, building, roadside, community, etc., respectively.

In further detail, as data travels up in the hierarchy at each router node in the hierarchy, various pluggable data reduction techniques may be applied on the incoming streaming and non-streaming data in order to extract meaningful information (i.e., metadata). That is, as data is generated at the sources (data generating devices 110), the lowest level gateway/router 120 could store more granular data, and as the information travel travels through the hierarchy, more filtered data/metadata is stored. This may be accomplished through a data reduction technique such as, for example, various reconfigurable statistical models, regression models, fusion models, Complex Event processing (CEP) models, various statistical filters (e.g., Kalman Filters), etc. Note that in accordance with the techniques herein, the models, policies as well as coefficients of each models may be configurable on-the-fly in order to account for changes coming from higher order routers or the cloud or other segments, accordingly.

Similarly, as a query travels down the hierarchy from the cloud (e.g., from a Business Intelligence Layer, whether automated or from a user request) or higher order router to the lower routers, each higher order entity acts as:
  a. query parser;
  b. query planner/scheduler;
  c. dispatcher of split query coming from a planner to lower order routers; and
  d. query result collector and fuser as the result travels up the hierarchy.

Note that a query also consists of a context modifier field that will allow the user/higher order entities to obtain results using different schemas on the same data set. For example, the context modifier can be conditions on the data set or a combination of data sets (such as: if X>Y, if X and Y are true, etc.). The context modifier may also include filters on the data, such as geo-filters, event-filters, etc. Accordingly, regarding "c." above, queries that indicate a context related to multiple data sets may be split by a router "R" that knows data set "A" is handled by router "X" and data set "B" by router "Y" where "X" and "Y" are downstream from "R." In addition, regarding "d." above, in the upward direction, schemas that collapse related data (combining data sets) can be employed to minimize metadata, as well.

In order to achieve dynamic close control loop based action needed to manage or prevent a situation, the embodiments herein propose to use a technique in which the schema is continuously changing based on the new collected data types being discovered (e.g., new sensors and their data formats) and new queries (query types) that are being received. For example, say sensor X, which was previously not present, is added to the network 100, and starts generating new data that streams through the access router/aggregator 120. A user who is interested in the data generated by X sends a query to the access router related to the data generated by X. However, since the router would not have previously defined X's information as part of the schema, the router may not be able to serve the query.

For dynamic schemas as described herein, therefore, any time a query cannot be served (a query returns null), the schema may be updated to account for the new query. For example, in one embodiment, a user will be given an interface to the cloud which can analyze the miss and modify the schema and push the new schema to the routers 120 so transformation of information can be done differently. That is, an interface, such as a cloud portal, website, etc., where the user can send queries directly to the routers may be provided for the user to specify not only the queries, but also a new schema, such as in response to a query that cannot be served. Alternatively, the query may be examined, and the routers themselves may be configured to determine the appropriate action to update the schema. In this manner, structured queries may become acceptable for otherwise unstructured (or semi-structured) data, without a burdening amount of pre-configuration. (Notably, data may be unstructured, structured, semi-structured, or any suitable mix thereof.)

In particular, in order to prevent such misses, the router will use the local sensor and data type discovery or incoming query to recognize X's data and reconfigure the schema on the fly without the overhead of cloud based database techniques given it is based on a localized streaming space window over a given time window. Over time this scheme is capable of catering to a large number of queries that might focus on different pieces/features of the data. Note also that new schema may be adopted on the fly if the new type of received data exceeds some pre-configured or dynamically determined thresholds. That is, at the edge routers connected to sensor networks clusters (level I), the incoming volume of raw sensor data is transformed and reduced using streaming techniques.

In accordance with one or more embodiments herein, the schema is thus not kept rigid (generally static) as in existing standards and streaming database techniques. On the contrary, the techniques herein modify/re-configure the schema dynamically based on the learning of new sensors and respective data types using local sensor discovery or discovery through new queries. It can be used to serve various types of future dynamically queries as it applies to newly discovered sensors and data which was not captured before by the schema. In traditional mechanisms, this involves the loss of raw data, which may cause some future queries to fail due to lack of information. If the schema is not properly generated a large number/types of queries may fail. This is especially true, since it is generally impossible to anticipate all the types of queries that may be generated in the future. As such, as described herein, routers automatically discover new sensors/actuators with data types, in addition to allowing users to specify events to look for through query expressions. These discoveries and/or specifications can thus be translated into a schema that will be appended/integrated/joined with the existing schema that the A/Ag router uses to process and/or store the data.

Figure 4:
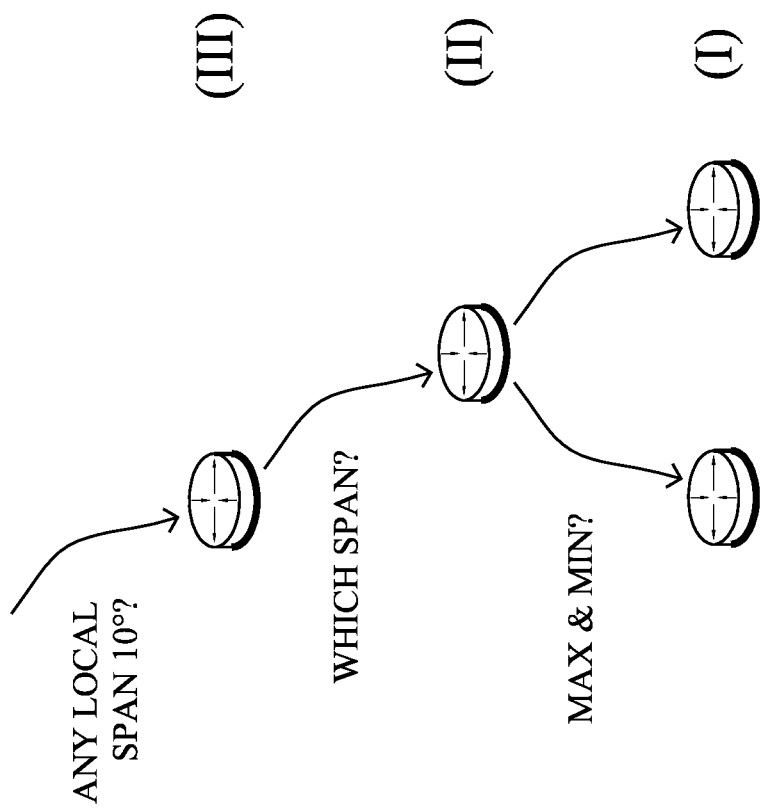
FIG. 4 illustrates an example of dynamic hierarchical data collection for updating a dynamic schema.

For example, in one embodiment, the higher layer routers can monitor the data, and can run software to detect new information and events of interest. They can then generate schemas/policies online and push them to the A/Ag routers. For instance, as shown in FIG. 4, assume that the higher level router (or the centralized device 130) has requested a new schema that monitors a range of temperatures rather than just a maximum. The level III router may then be configured to store metadata corresponding to whether any local temperatures (e.g., on a single sensor) differed by more than 10 degrees, and the level II routers would store which particular locations spanned the difference. Also, the level I routers may be configured with an updated schema that requests not only the maximum temperature, but also now the minimum. Proactively pushing the updated schema to the routers in this fashion helps to reduce the delay between the generation of new data and capturing it to serve queries based on the new data. This can also be used to perform fine grained analysis of an event.

Alternatively or in addition, as shown in FIG. 5A, there may be instances where the dynamic schema does not define a conversion for particular collected data, such as when new data is being collected (e.g., humidity sensors added to the network). As such, the A/Ag routers may simply store the particular collected data as raw data, and transmits the raw data to one or more hierarchically higher routers in the network as shown in FIG. 5B. Once one of the hierarchically higher routers, or even the centralized device 130, receives and discovers the raw data's purpose, a new updated dynamic schema may be generated, and may be pushed back toward the new sensors, e.g., as shown in FIG. 5C, such that devices receiving the data will be prepared to receive it.

In other words, in cases where a suitable schema cannot be determined, the higher layer routers may receive (e.g., may request) from the A/Ag routers the raw data that can then be stored/transmitted to the cloud for further analysis. The analysis at the cloud can be performed either manually or using advanced rules engines which will generate new requests and new actions/schemas for the unknown event. The techniques herein can form a closed loop by pushing these new rules/schemas to the A/Ag server so they know what to do when they detect such an event in future. In this way the system can continuously be tuned and improved. Also, in yet another embodiment the A/Ag router may send request to higher layer routers should they fail responding to a new request in order to get help and receive a new schema.

Notably, the schema may also be continuously pruned based on the changing sensor discovery as well as queries and unused fields are dropped in order to keep the storage requirements at the A/Ag router to a minimum (e.g., where a dynamic schema is time-limited). For example, users might want to generate specific queries when an event is detected and those queries might be valid only for short period of time after the event is detected. Instead of using a schema that will serve these short lived queries (which in turn will result in higher storage requirements at the A/Ag router), the higher layer routers can push the new schema to the A/Ag routers when such events are detected so the short lived queries can be served.

Note that the dynamic schema discussed above are particularly suitable for observing, commanding, and controlling the future communities in a autonomous and dynamic way using distributed and hierarchy of routers. In particular, the techniques herein focus on autonomous and dynamic discovery and control of diverse sensor objects, their data types, creation of dynamic database with dynamic schemas, and allows dynamic hierarchical streaming queries to be applied on sensor streams using distributed hierarchical router infrastructure. Moreover, distributed and hierarchical routers observe the sensor patterns in one part of the community and infer the behavior based on learning, create dynamic query policies/rules which then pushed to the other part of the community of routers for observing sensors streams in a given community setup. For example, if one part of a Connected Community (e.g., one location, such as a particular building) observed certain patterns of an earthquake, this may be inferred and communicated to the other parts of community of routers (e.g., to other buildings), to provide close control loop to assets that may need to be protected. In other words, according to the techniques herein, a particular behavior may be detected based on the collected data, and in response, the dynamic schema may be updated for hierarchically lower (or equal) routers based on the detected behavior.

Figure 6C:
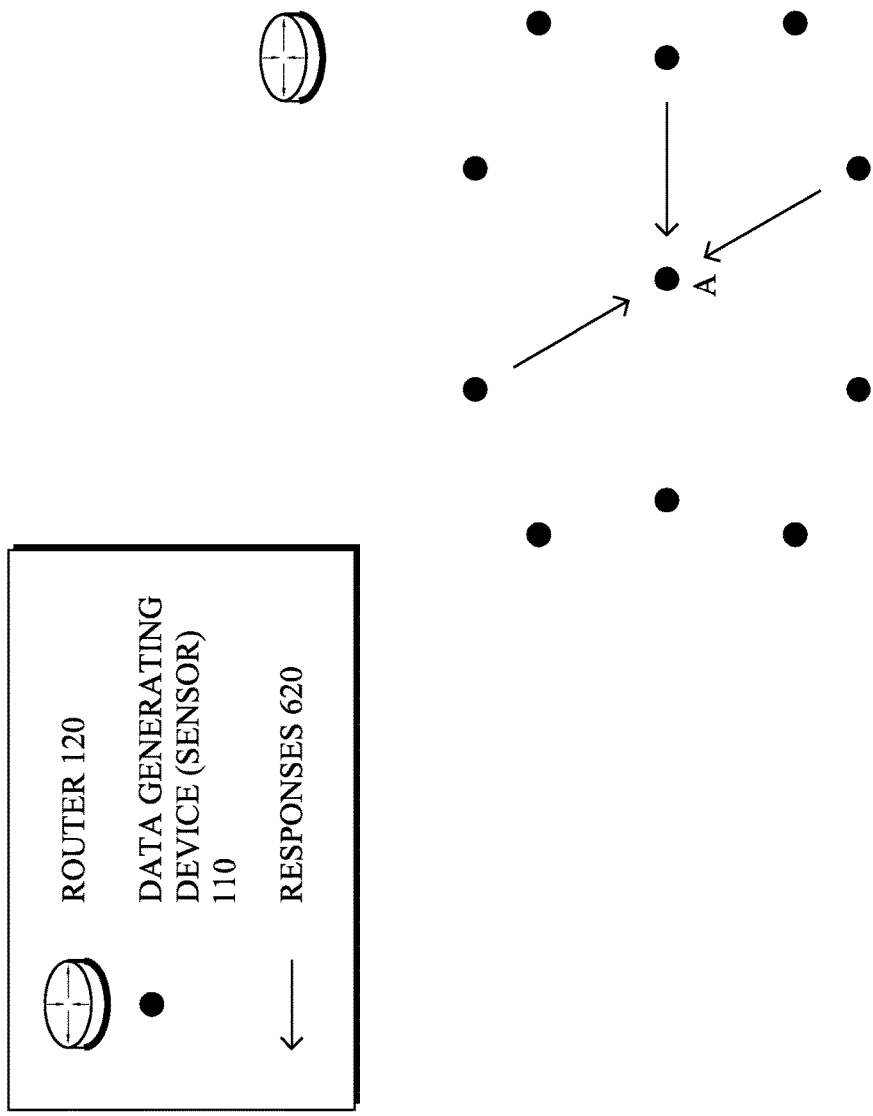

In another embodiment, the techniques herein use a collaborative approach based on geography. For instance, as shown in FIG. 6A, when a device bootstraps, it may first determine its location, e.g., through network locating and/or GPS location, and may send a registration request 605 to a higher hierarchical router/device (e.g., level I or above router 120, or else to a centralized device 130, such as a DHCP server), in order to determine whether to activate (i.e., which subset of the hierarchically lower sensors are to be used). The registration device (e.g., DHCP server) would allocate a location_number for the particular location, along with a number N of devices that should sense data of type X in the same region. Once the devices boot up, gather its location (e.g., its address) and location_number, as shown in FIG. 6B it may send a link local multicast packet ("offering message 615) so as to offer to send data of type X according to its sensing capability. If the number M of devices that reply with responses 620 as in FIG. 6C is greater than (or equal to) N, then the data generation (sensing) is disabled on that node, thus limiting the number of device sending data of type X to the strict minimum (limiting a number of active sensors), and also thus reducing traffic in the area and saving energy.

In yet another embodiment, all devices in the area also report their capability, that is, determining which hierarchically lower sensors to activate based on specific capability of the sensors. If there are already N sensing device for data of Type X, but the new booting devices is more powerful in terms of CPU power, or energy (e.g., is main-powered) it could replace other data generating devices 110. The system could then re-check on a regular basis should one of the N nodes have died and do a re-election process. Note also that the number of nodes N may be dynamically adjusted.

Figure 7:
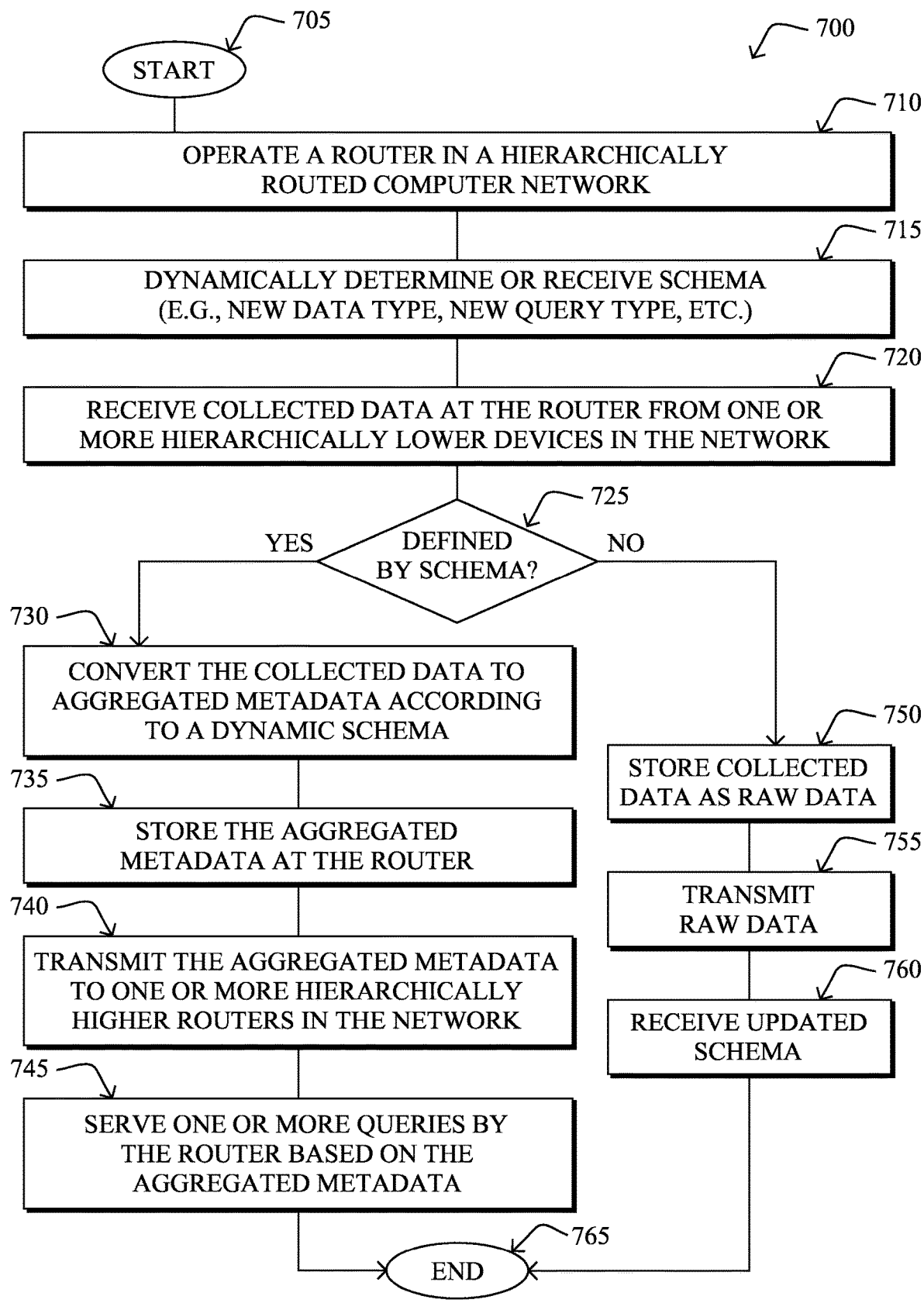
FIG. 7 illustrates an example simplified procedure for providing for dynamic hierarchical collection of data in a computer network.

FIG. 7 illustrates an example simplified procedure for providing for dynamic hierarchical collection of data in a computer network in accordance with one or more embodiments described herein. The procedure 700 starts at step 705, and continues to step 710, where, as described in greater detail above, a device 200 operates as a router 120 in a hierarchically routed computer network 100. In step 715, the router dynamically determines or otherwise receives the dynamic schema, such as based on a new data type, a new query type, or other impetus.

Upon receiving collected data at the router in step 720 from one or more hierarchically lower devices in the network, such as sensors 110 (raw data) or lower routers 120 (aggregated metadata), if the processing of the collected data is defined by the schema in step 725, then in step 730 the router converts the collected data into aggregated metadata according to the dynamic schema, accordingly. As such, the aggregated metadata may be stored at the router in step 735, and may also be transmitted in step 740 to one or more hierarchically higher routers in the network. At some point, in step 745, the router may thus serve one or more queries based on the aggregated metadata.

In the event that the schema does not define how to process the data in step 725, then in step 750 the router may store the collected data as raw data, and transmits the raw data upstream to hierarchically higher routers in step 755, e.g., up to the centralized device 130. From any of those hierarchically higher devices, the router in question may then receive an updated schema in step 760.

The procedure 700 ends in step 765, notably with the option to return to any appropriate step above, such as step 715 to receive an updated schema (e.g., in correlation to step 760), and to further process more collected data and/or queries, accordingly.

Figure 8:
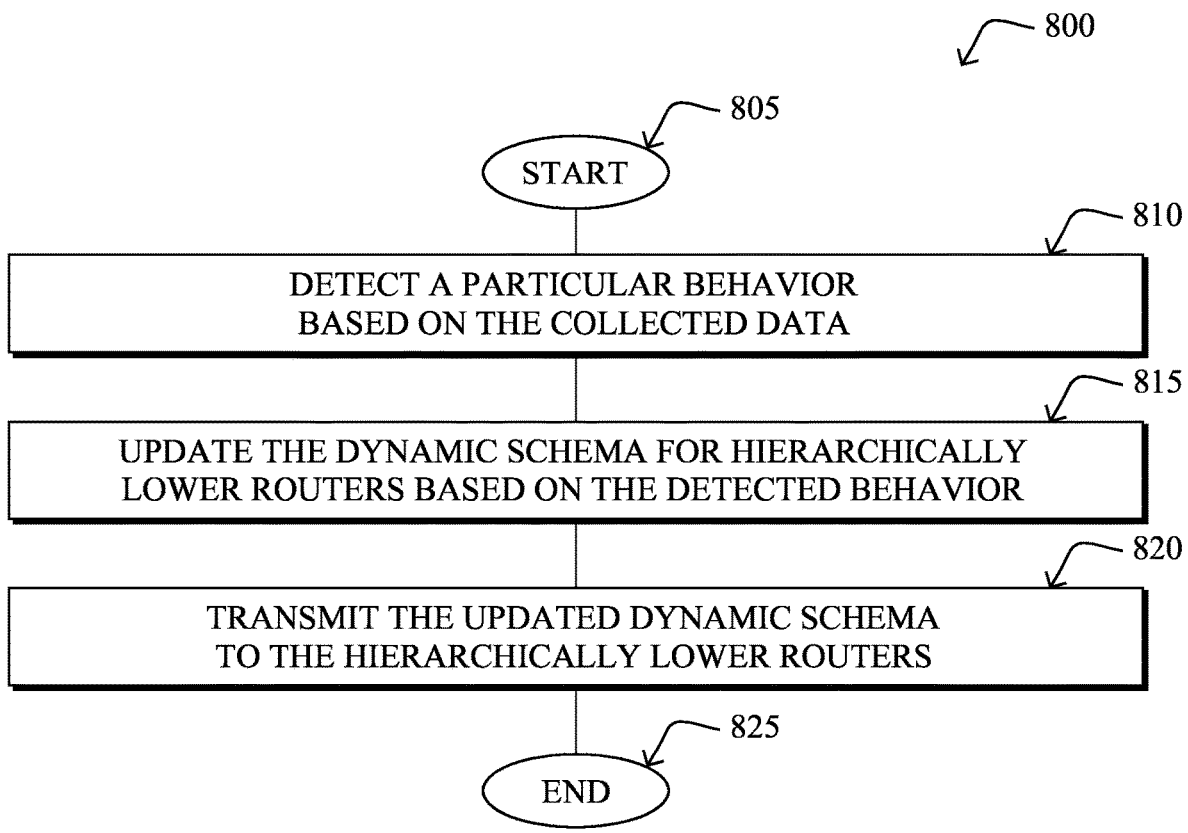
FIG. 8 illustrates an example simplified procedure for dynamically updating schema.

In addition, FIG. 8 illustrates an example simplified procedure for dynamically updating schema in accordance with one or more embodiments described herein. The procedure 800 starts at step 805, and continues to step 810, where a router detects a particular behavior based on the collected data, the details of which being described in much greater detail above. In step 815, the router correspondingly updates the dynamic schema for hierarchically lower routers (or equal routers) based on the detected behavior, and in step 820, transmits the updated dynamic schema to the hierarchically lower (or equal) routers. The simplified procedure 800 then ends in step 825, e.g., until other behavior is detected that merits a schema change.

Figure 9:
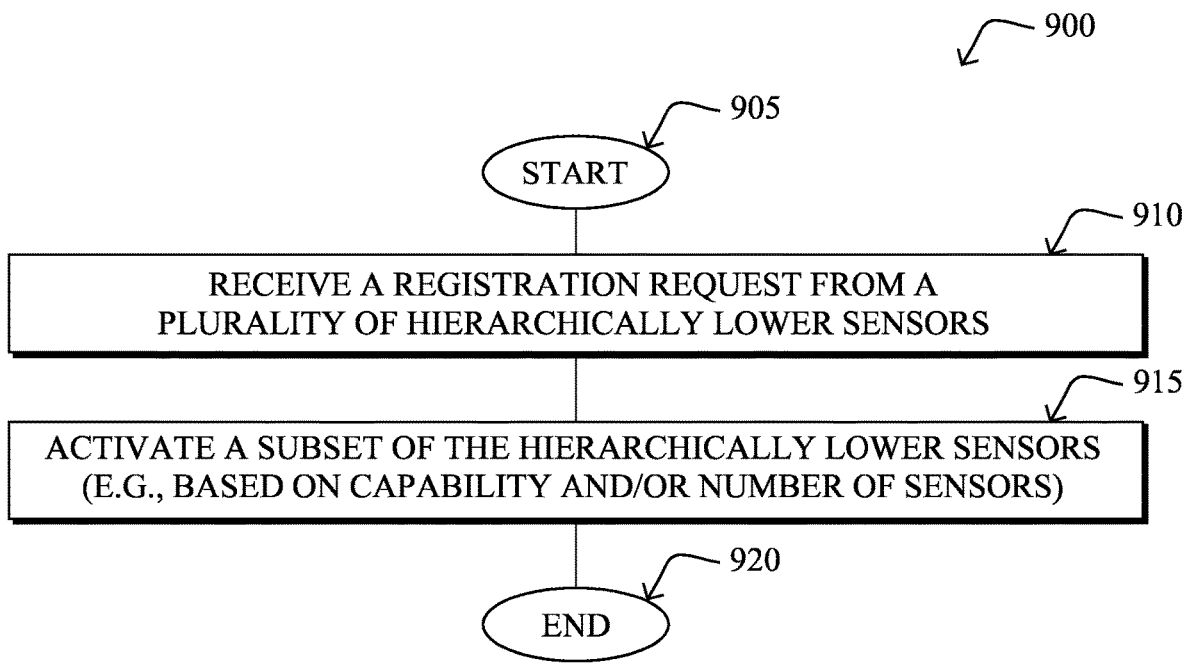
FIG. 9 illustrates an example simplified procedure for activating data generating devices, e.g., from the perspective of the router or centralized device (e.g., DHCP server)

FIG. 9 illustrates an example simplified procedure for activating data generating devices in accordance with one or more embodiments described herein, e.g., from the perspective of the router or centralized device (e.g., DHCP server). The procedure 900 starts at step 905, and continues to step 910, where, as described in greater detail above, the router/device receives a registration request 605 from a plurality of hierarchically lower sensors 110. Based on one or more particular implementations, in step 915 the router/device correspondingly "activates" a subset of the hierarchically lower sensors, e.g., based on capability and/or a number of sensors, such as by returning affirmative replies 610, or by returning a reply 610 indicating conditions for activation (e.g., the number N of active data generation devices for a particular location). The simplified procedure 900 ends in step 920.

Figure 10:
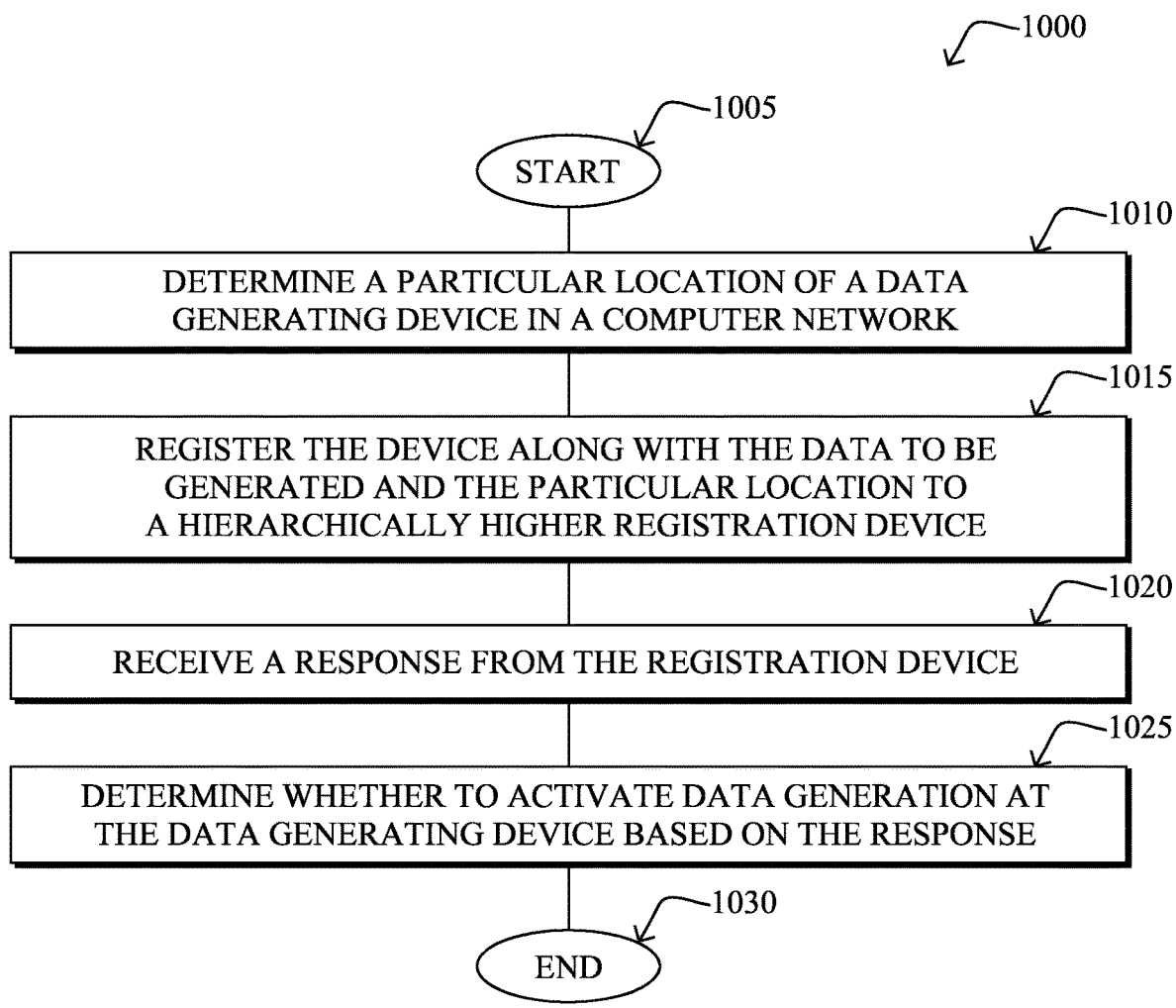
FIG. 10 illustrates an example simplified procedure for activating data generating devices, e.g., from the perspective of the data generating device (e.g., sensor)

Conversely, FIG. 10 illustrates an example simplified procedure for activating data generating devices in accordance with one or more embodiments described herein, e.g., from the perspective of the data generating device (e.g., sensor) 110. The procedure 1000 starts at step 1005, and continues to step 1010, where, as described in greater detail above, the data generating device determines its particular location, e.g., via GPS or network location services. Then in step 1015, the device 110 attempts to register itself to a hierarchically higher registration device by indicating its data to be generated and the particular location. Generally, in step 1020, the data generating device receives a response 610 from the registration device, and in step 1025 determines whether to activate data generation based on the response, accordingly. The procedure 1000 then ends in step 1030, i.e., after having activated or not.

Figure 11:
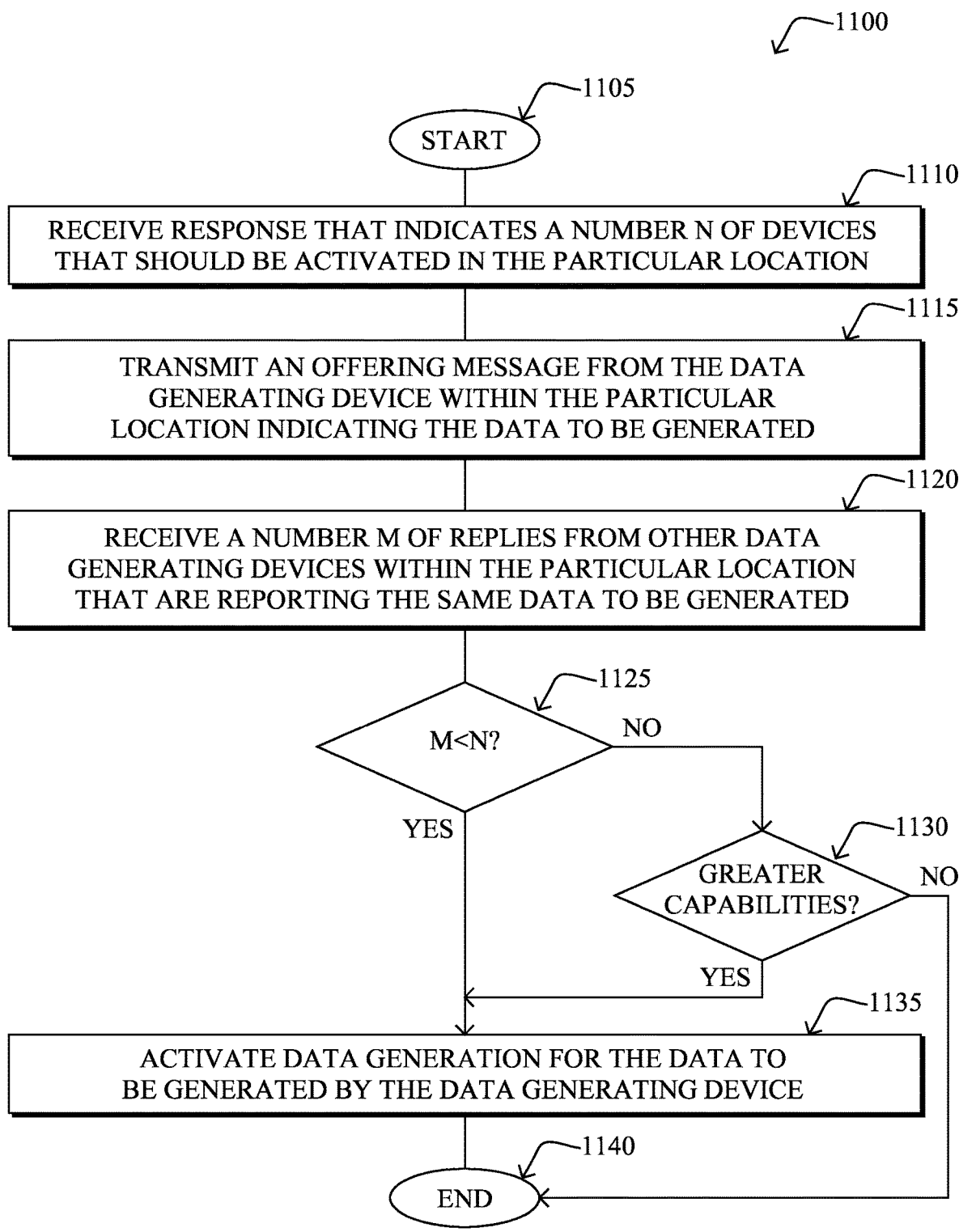
FIG. 11 illustrates another, more specific, example simplified procedure for activating a data generating device from the perspective of the data generating device.

Lastly, FIG. 11 illustrates another, more specific, example simplified procedure for activating a data generating device in accordance with one or more embodiments described herein from the perspective of the data generating device. The procedure 1100 starts at step 1105, and continues to step 1110, where, in greater detail than procedure 1000 of FIG. 10 above, the data generating device 110 may receive a response 610 that indicates a number N of devices that should be activated in the particular location. As such, the data generating device may then transmit an offering message 615 within the particular location indicating the data to be generated in step 1115, and may correspondingly receive a number M of replies 620 from other data generating devices within the particular location that are reporting the same data to be generated in step 1120. If M is less than N in step 1125, or if M is not less than N but the data generating device has greater capabilities in step 1130 (as detailed above), then in step 1135 the data generating device activates its data generation for the data to be generated. Otherwise, the procedure 1100 merely ends in step 1140 without having activated data generation. Notably, data generation may be called upon later, or may be re-attempted at a future time, and as such, procedure 1100 may restart, accordingly.

It should be noted that while certain steps within procedures 700-1100 may be optional as described above, the steps shown in FIGS. 7-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-1100 are described separately, certain steps from each procedure may be incorporated into each other procedure, and the procedures are not meant to be mutually exclusive.

The novel techniques described herein, therefore, provide for dynamic hierarchical collection of data in a computer network. In particular, as opposed to companies and enterprises that are using traditional client-server approaches and traditional static approaches, the techniques herein provide a scalable, extensible, distributed, dynamic learning-based, autonomous, and hierarchical router-based approach to deal with the impending explosion of sensor objects and their data. For instance, the techniques herein allow for relaxing the need for heavy cloud resources, that is, they do not need traditional database systems, high bandwidth networks, or heavy storage, since sensor data discovery and query processing are local-aware and real-time in nature. In addition, the techniques herein also provide close control loop on events which are discovered dynamically, something that is not possible in traditional SQL or traditional streaming databases where schemas are static.

Specifically, previous schemes are highly static, predefined, and not particularly suitable for observing, commanding, and controlling communities in an autonomous and dynamic way using a distributed hierarchy of routers. The techniques herein focus on autonomous and dynamic discovery and control of diverse sensor objects and their data types, as well as the creation of dynamic database with dynamic schemas, and allow dynamic hierarchical streaming queries to be applied on sensor streams using distributed hierarchical router infrastructure. Moreover, as noted above, distributed and hierarchical routers can observe the sensor patterns in one part of the community and infer the behavior based on learning, create dynamic query policies/rules which then pushed to the other part of the community of routers for observing sensors streams in a given community setup. For example, if one part of a Connected Community observed certain patterns of earthquakes, this may be inferred and communicated to the other parts of community of routers, to provide close control loop to the assets that needs to be protected.

The techniques herein are a scalable, extensible, distributed, dynamic learning based, autonomous and hierarchical router based approach to deal with the impending explosive sensor objects and their data, as opposed to having an overlay architecture, as is the case today. In particular, the extensible sensor data management architecture allows for flexible integration of heterogeneous and distributed sensor information that is dynamically discovered by the sensor aggregation router. In this approach a semantic relationship is maintained between sensor objects and the data received during the discovery process. As a result predefined physical schema or translation tables are not required, where instead the techniques use universal sensor data record identifiers for the sensor object and its information as a property, thus allowing essentially unlimited sensor objects with unlimited data types to be linked to the dynamic sensor data grid.

While there have been shown and described illustrative embodiments that provide for dynamic hierarchical collection of data in a computer network, it is to be understood that various other adaptations and modifications may be made within the spirit and scope of the embodiments herein. For example, the embodiments have been shown and described herein with relation to LLNs and sensor networks. However, the embodiments in their broader sense are not as limited, and may, in fact, be used with other types of hierarchical computer networks and/or corresponding protocols.

In addition, while certain schema and sensed data have been shown, it is important to note that these are merely examples, and that any data may be sensed/collected, and also that any schema based on that data may be defined, manually or through various rules engines. Moreover, while the schemas have been shown as becoming more or less granular as levels of hierarchy are traversed, this need not be the limiting scenario herein. For instance, certain intermediate routers in the hierarchy need not store any data, or may actually duplicate some of the stored data, without parting from the scope of the embodiments herein. For example, while certain physical characteristic sensors were shown (temperature and humidity), any collected data may benefit from the techniques herein, such as traffic patterns, consumer purchases, online game statistics, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a particular location of a data generating device in a computer network;
    registering the data generating device along with the data to be generated and the particular location to a hierarchically higher registration device;
    receiving, at the data generating network device, a response from the registration device wherein the response indicates a number N of devices that should be activated in the particular location;
    based on the response, transmitting an offering message from the data generating device indicating the data to be generated;
    receiving a number M of replies from other data generating devices within the particular location that are reporting the same data to be generated; and
    activating data generation for the data to be generated by the data generating device in response to M being less than N.

2. The method of claim 1, further comprising:
    deactivating data generation at the data generating devices once M is greater than N.

3. The method of claim 1, wherein the data generating device is a sensor and the registration devices is a dynamic host control protocol server.

4. The method of claim 1, further comprising:
    allocating a location number for a particular location, along with a number N devices at the particular location that should generate data of type X in the particular location.

5. The method of claim 1, further comprising:
    receiving, from one or more possible data generating devices in the computer network, an offering message indicating an ability to send data of type X.

6. An apparatus, comprising:
    one or more network interfaces to communicate within a hierarchically routed computer network;
    a processor coupled to the network interfaces and adapted to execute one or more processes; and
    a memory configured to store a process executable by the processor, the process when executed operable to:
        determining a particular location of the apparatus in a computer network, wherein the apparatus is a data generating device;
        registering the apparatus along with the data to be generated and the particular location to a hierarchically higher registration device;
        receiving a response from the registration device, wherein the response indicates a number N of devices that should be activated in the particular location;
        transmit an offering message from the apparatus within the particular location indicating the data to be generated;
        receive a number M of replies from other data generating devices within the particular location that are reporting the same data to be generated; and
        activate data generation for the data to be generated in response to M being less than N.

7. The apparatus of claim 6, wherein the process when executed is further operable to:
    deactivate data generation at the data generating devices once M is greater than N.

8. The apparatus of claim 6, wherein the apparatus is a dynamic host control protocol server.

9. The apparatus of claim 6, wherein the process when executed is further operable to:
    allocate a location number for a particular location, along with a number N devices at the particular location that should generate data of type X in the particular location.

10. The apparatus of claim 6, wherein the process when executed is further operable to:
    receive, from one or more possible data generating devices in the hierarchically routed computer network, an offering message indicating an ability to send data of type X.

11. A tangible, non-transitory, computer-readable media having software encoded thereon, the software when executed by a processor operable to:
    determine a particular location of a data generating device in a computer network;

register the data generating device along with the data to be generated and the particular location to a hierarchically higher registration device;

receive a response from the registration device, wherein the response indicates a number N of devices that should be activated in the particular location;

transmit an offering message from the data generating device within the particular location indicating the data to be generated;

receive a number M of replies from other data generating devices within the particular location that are reporting the same data to be generated; and activate data generation for the data to be generated by the data generating device in response to M being less than N.

12. The tangible, non-transitory, computer-readable media of claim 11, wherein the software when executed is further operable to:

deactivate data generation at the data generating devices once M is greater than N.

13. The tangible, non-transitory, computer-readable media of claim 11, wherein the processor is installed on a dynamic host control protocol server.

14. The tangible, non-transitory, computer-readable media of claim 11, wherein the software when executed is further operable to:

allocate a location number for a particular location, along with a number N devices at the particular location that should generate data of type X in the particular location.

15. The tangible, non-transitory, computer-readable media of claim 11, wherein the software when executed is further operable to:

receive, from one or more possible data generating devices in the hierarchically routed computer network, an offering message indicating an ability to send data of type X.

* * * * *